Feb. 21, 1939.  N. F. FOX  2,148,066
DEVICE FOR APPLYING DENTAL FLOSS
Filed April 19, 1938
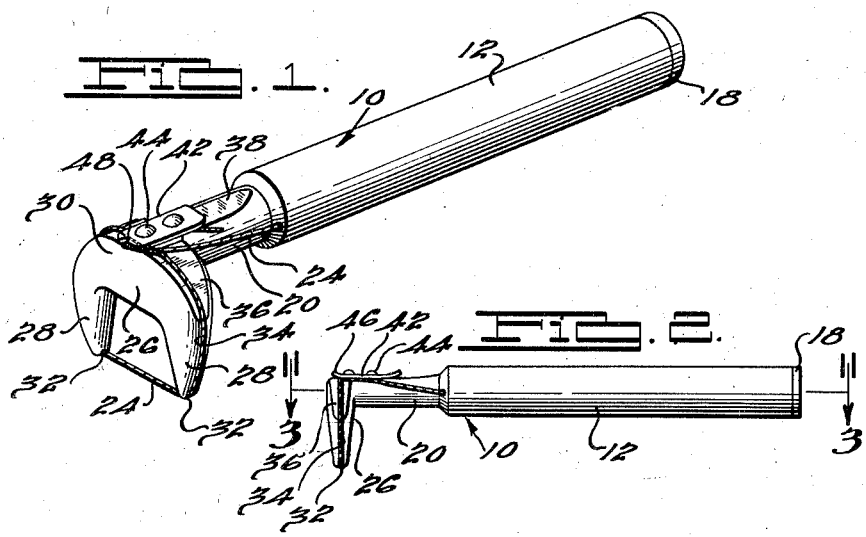
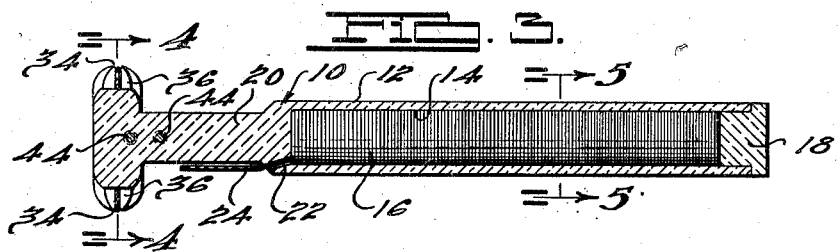
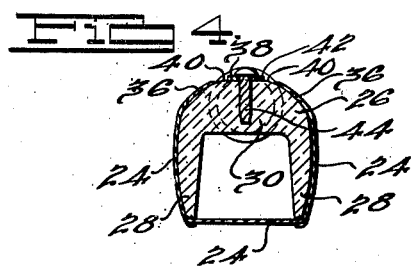
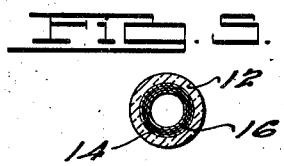
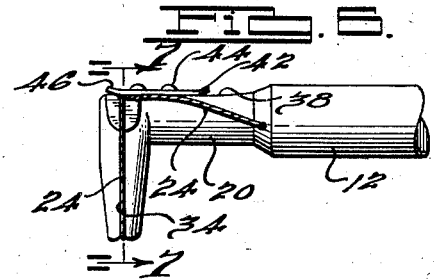
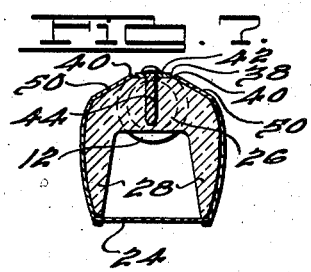
INVENTOR
Norman F. Fox.
BY
Harness, Dickey & Pierce.
ATTORNEYS.

Patented Feb. 21, 1939

2,148,066

UNITED STATES PATENT OFFICE 2,148,066

DEVICE FOR APPLYING DENTAL FLOSS

Norman F. Fox, Detroit, Mich.

Application April 19, 1938, Serial No. 202,930

10 Claims. (Cl. 132—92)

The present invention relates to improved devices for applying dental floss, and particularly relates to such devices having a handle, which may include a holder, for containing a supply of dental floss and which has a forked portion adapted to removably hold, or suspend, a strand of dental floss in a taut condition.

One of the primary objects of the present invention is to provide improved devices of the type mentioned, whereby a strand or ribbon of dental floss is positioned and fastened in an improved manner.

Another object of the present invention is to provide improved constructions and arrangements of grooved and flat surfaces in the forked heads of the devices of the type mentioned, whereby an improved snubbing action on the strands or threads of dental floss is obtained thereby assuring a taut position for the strands in the cleaning portions thereof.

Another object of the invention is to provide an improved arrangement of the snubbing clip relative to the surfaces of the device engaged by the floss, whereby an improved fastening of the floss is attained.

Another object of the invention is to provide a structure in which the opening through which the floss extends from the supply container is at one side of the device so that the strand is in a convenient position for initial wedging under the forward end of an attaching clip fixed to the top of the device.

Other objects of the present invention will become more apparent from the following specification, the drawing relating thereto and from the claims hereinafter set forth.

In the drawing, in which like numerals are used to designate like parts in the several views throughout:

Figure 1 is a perspective view of a device for applying dental floss, embodying features of the present invention;

Fig. 2 is a side elevational view on a slightly reduced scale of the device illustrated in Fig. 1;

Fig. 3 is a cross-sectional view taken substantially along the lines 3—3 of Fig. 2 on a slightly enlarged scale;

Fig. 4 is a cross-sectional view taken substantially along the lines 4—4 of Fig. 3;

Fig. 5 is a cross-sectional view taken substantially along the lines 5—5 of Fig. 3;

Fig. 6 is a fragmentary side elevational view of a modified form of device embodying features of the present invention;

Fig. 7 is a cross-sectional view taken substantially along the lines 7—7 of Fig. 6.

Referring to the drawing, and referring particularly to Figs. 1 to 5 thereof, one embodiment of the invention is illustrated. The device for applying dental floss there shown comprises a main body portion, generally indicated at 10, which is preferably formed of a molded or cast plastic material. The main body has a holder or handle portion 12, which has a generally cylindrical recess 14 extending longitudinally of the holder and opening through the rear end thereof. The recess 14 provides a space within which a supply of dental floss 16 is received and held within the recess by means of an end cap 18.

The holder 12 has a forward end forming a neck 20, which is solid and which is of reduced size as compared with the rear portion of the holder within which the floss is retained. An opening 22 is provided through the holder communicating with the chamber 14, through which a strand 24 of the dental floss may be passed for attachment to a thread or strand suspension means at the front of the holder. By having the opening 22 in the side of the holder, the strand of floss is in a position to one side of the attaching means so that it may be more easily wedged under the attaching means in its first passage thereunder.

The suspension means is in the form of a forked or bifurcated head 26, having tines 28 and a base 30. The head 26 is formed integral with the handle or holder portion of the device and preferably lies in a plane at right angles to the axis of the holder.

The particular shape of the head forms an important part of the present invention, as it is necessary that the floss be held under sufficient tension to enable the user to most efficiently use it, because of sagging due to slipping out of position. So that the floss, which is carried by the head and suspended between the tines adjacent the forward ends thereof, may at all times be taut, the forward ends of the tines 28 are provided with slots 32 which communicate with longitudinally extending grooves 34 formed in the outer surfaces of the tines and extending toward the base of the head. A longitudinally curved and transverse substantially flat portion is provided at each side of the head 26 joining the grooves 34. These transverse flat portions extend partly on the tines, around the corners of the base and along the base itself toward the center of the base. Another flat portion 38 is provided between the portions 36 on the base of the head at substantially its center and extends longitudinally of the neck 20 of the holder.

Referring particularly to Fig. 4, it can be seen that at the juncture lines, indicated at 40, between the flat portion 38 and the transversely flat portions 36, edged lines are formed over which the strand 24 of the dental floss passes; and these edges serve as snubbing means to prevent sagging or displacement of the dental floss when pressure is applied thereto in use.

An attaching or snubbing clip 42 is fixed to the flat portion 38 by means of screws 44, or the like, and the clip 42 is bent slightly upwardly at its forward end 46 so that the floss may be wedged under the clip and removably held in position. The rear end of the clip may also be bent slightly away from the flat surface 38 so that the strand of floss may also be wedged thereunder, or the flat surface 38 may be cut slightly away adjacent the rear edge so as to provide a slight space between the rear edge and the surface 38 for the reception of the floss in order to wedge it under the clip. It is also pointed out that the clip is so positioned by proper location of the screws 44 in relation to the holder that the bent up forward edge of the clip is substantially aligned with the grooves 34 so that the thread 24 is only slightly deviated from a straight line in its passage from the groove 34 to position under the clip. The deviation which takes place when the floss is drawn forwardly so that it may be drawn under the clip is made possible by the transversely flat portion 50 which permits the floss 24 to be extended forward of line 34 in order to be wedged under clip 42 without slipping out of groove 34. The clip 42 is of less width than the width of the flat portion 38, so that the edges of the clip are inwardly spaced from the edges 40.

One preferable way of suspending the dental floss over the tines and binding it in position is to draw the thread 24 under the forward edge of the clip 42 from the side having the opening 22 therein, and then sidewardly into one of the grooves 34, over the front of the tines within the grooves 32, and back through the opposite groove 34 and again under the forward edge of the clip. The cord thus passes over the surfaces 36, and the free end of the cord, which has been passed under the forward edge of the clip, and over the top of strand previously wedged under forward end of clip 42 thus forming a double lock which prevents strand of floss from loosening in either direction over grooves 32 and 34. The loose end of floss may then be drawn under the rear edge to further bind it. The edge of the grooves 34 joining with the transverse flat portion 36 serves as a snubbing edge, and also the edges 40 joining the flat surface 38 with the surfaces 36 have a snubbing action, so that the thread 24 is held in a taut condition and does not slip during its use.

The clip 42 may be provided with a notched sharp edge 48 adjacent the front thereof which may serve to cut the thread 24 at any desired point, as it is withdrawn from the chamber 14.

In Figs. 6 and 7, a modified structure is illustrated, which is substantially the same as the structure described above, except that instead of having the longitudinally curved surfaces 36, as in the embodiment described above, surface portions 50 are formed in the head 26, which are both longitudinally and transversely flat. The edged lines 40 between the flat portion 38 and the flat portion 50 are more pronounced in this embodiment and also a more abrupt change in direction between the portion 50 and the rear edges of the slots 34 is present, so that an increased snubbing action on the strand 24 takes place, thus serving to further insure against sagging of the dental floss.

Formal changes may be made in the specific embodiments of the invention described without departing from the spirit and substance of the invention, the scope of which is commensurate with the appended claims.

What is claimed is:

1. In a device for applying dental floss, a body portion having a forked head providing a thread suspension means, the tines of said forked head being provided with longitudinally extending grooves in the outer surfaces adjacent the front thereof, said head having transverse substantially flat outer surface portions adjoining said grooves, and an attaching clip fixed to said body portion adjacent said head.

2. In a device for applying dental floss, a body portion having a forked head providing a thread suspension means, the tines of said forked head being provided with longitudinally extending grooves in the outer surfaces adjacent the front thereof, said head having transverse, substantially flat portions adjacent said grooves and having another flat portion between said first named flat portions, the adjoining lines between said flat portions providing snubbing means, and an attaching clip fixed to said body portion.

3. In a device for applying dental floss, a body portion having a forked head providing a thread suspension means, the tines of said forked head being provided with longitudinally extending grooves in the outer surfaces adjacent the front thereof, said head having transverse, substantially flat portions adjacent said grooves and having another flat portion between said first named flat portions, the plane of said another flat portion intersecting the planes of said first named flat portions so that the adjoining edge lines between said flat portions provide snubbing means, and an attaching clip fixed to said body portion.

4. In a device for applying dental floss, a body portion having a forked head providing a thread suspension means, the tines of said forked head being provided with longitudinally extending grooves in the outer surfaces adjacent the front thereof, said head having longitudinally curved and transverse, substantially flat portions adjacent said grooves and having another flat portion between said longitudinally extending and transverse flat portions, the adjoining edge lines between said flat portions providing snubbing means, and an attaching clip fixed to said body portion.

5. In a device for applying dental floss, a body portion having a forked head providing a thread suspension means and having an elongated holder portion integral with said head at an angle thereto, the tines of said forked head being provided with longitudinally extending grooves in the outer surfaces adjacent the front thereof, said head having transverse, substantially flat portions adjacent said grooves and having another flat portion at the base of said head between said first named flat portions and extending longitudinally of said holder, the adjoining edge lines between said flat portions providing snubbing means, and an attaching clip fixed to said another flat portion.

6. In a device for applying dental floss, a body portion having a forked head providing a thread suspension means, the tines of said forked head being provided with longitudinally extending grooves in the outer surfaces adjacent the front thereof, said head having longitudinally curved and transverse, substantially flat portions adjoining said grooves, and an attaching clip fixed to said body portion with an attaching portion substantially aligned with the grooves.

7. In a device for applying dental floss, a body portion having a forked head providing a thread suspension means, the tines of said forked head being provided with longitudinally extending grooves in the outer surfaces adjacent the front thereof, said head having transverse, substantially flat portions adjoining said grooves and having another flat portion between said first named flat portions, the adjoining edge lines between said flat portions providing snubbing means, and an attaching clip fixed to said body portion adjacent said head in such a position that the attaching portion of said clip is substantially aligned with said groove.

8. In a device for applying dental floss, a body portion having a forked head providing a thread suspension means and having an elongated holder portion integral with said head at an angle thereto, the tines of said forked head being provided with longitudinally extending grooves in the outer surfaces adjacent the front thereof, said head having transverse, substantially flat portions adjacent said grooves and having another flat portion at the base of said head between said first named flat portions and extending longitudinally of said holder, the adjoining edge lines between said flat portions providing snubbing means, and an attaching clip fixed to said another flat portion and extending longitudinally thereof, said clip being of less width than the width of the flat portion to which it is attached.

9. In a device for applying dental floss, a body portion having a forked head providing a thread suspension means, the tines of said forked head being provided with longitudinally extending grooves in the outer surfaces adjacent the front thereof, said head having transverse substantially flat outer surface portions adjoining said grooves, an attaching clip fixed to said body portion adjacent said head, said grooves, said flat outer surface portions and said attaching clip being so arranged relative to each other that the thread does not jump from said groove when the thread is being wedged under the attaching clip.

10. In a device for applying dental floss, an elongated body portion forming a handle, a forked head attached to said body portion providing a thread suspension means, said body portion having a recess therein to provide a thread receiving container, means providing an opening along the side of said body portion communicating with said recess and adapted to have the thread extend therethrough, the tines of said forked head being provided with longitudinally extending grooves in the outer surfaces adjacent the front thereof, said head having transverse substantially flat outer surface portions adjoining said grooves, and an attaching clip fixed to the top of said body portion adjacent said head with the forward end of said clip bent slightly upwardly, the arrangement of said opening relative to said clip being such that said thread may be easily wedged under the upwardly bent forward edge of said clip.

NORMAN F. FOX.